US009726891B2

United States Patent
Webster et al.

(10) Patent No.: US 9,726,891 B2
(45) Date of Patent: Aug. 8, 2017

(54) LEFT AND RIGHT EYE OPTICAL PATHS WITH SHARED OPTICAL ELEMENT FOR HEAD-MOUNTED DISPLAY DEVICE

(71) Applicant: Microsoft Technology Licensing, LLC, Redmond, WA (US)

(72) Inventors: James Randolph Webster, Redmond, WA (US); Jeb Wu, Redmond, WA (US); Richard James, Woodinville, WA (US); Steven John Robbins, Redmond, WA (US); Yarn Chee Poon, Redmond, WA (US); KengHui Lin, Taichung (TW); Chienchih Hsiung, Chubei (TW)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/845,195

(22) Filed: Sep. 3, 2015

(65) Prior Publication Data

US 2017/0068094 A1    Mar. 9, 2017

(51) Int. Cl.
*G02B 27/26* (2006.01)
*G02B 27/22* (2006.01)
(Continued)

(52) U.S. Cl.
CPC ......... *G02B 27/0172* (2013.01); *G02B 27/26* (2013.01); *G02B 27/283* (2013.01);
(Continued)

(58) Field of Classification Search
CPC ............ G03H 1/24; G03H 1/26; G03H 1/268; G03H 2001/0421; G03H 2001/0423;
(Continued)

(56) References Cited

U.S. PATENT DOCUMENTS

| 4,564,931 A | 1/1986 | Ohara et al. |
| 4,804,264 A | 2/1989 | Kirchhofer et al. |

(Continued)

FOREIGN PATENT DOCUMENTS

| WO | 9608736 A2 | 3/1996 |
| WO | 2008148927 A1 | 12/2008 |
| WO | WO 2015/034801 A2 | 3/2015 |

OTHER PUBLICATIONS

"Wire-Grid Polarizing Beamsplitter Cube," Retrieved on: Jun. 2, 2015, Available at: http://moxtek.com/wp-content/uploads/pdfs/ICE-Cube-OPT-TEC-1009.pdf.
(Continued)

*Primary Examiner* — Jade R Chwasz
(74) *Attorney, Agent, or Firm* — Perkins Coie LLP

(57) ABSTRACT

A display engine assembly comprises a first imager and a second imager to generate a left image and a right image, respectively, in a head-mounted display device. The left and right images are left and right components, respectively, of a single stereoscopic image. The display engine further comprises an optical waveguide optically coupled to the first imager and the second imager. The optical waveguide is part of a first optical path to convey the left image to a left eye of a user of the head-mounted display device and is also part of a second optical path to convey the right image to a right eye of the user of the head-mounted display device.

7 Claims, 8 Drawing Sheets

(51) Int. Cl.
*G02B 27/01* (2006.01)
*G02B 27/28* (2006.01)
*G02B 5/30* (2006.01)

(52) U.S. Cl.
CPC .... *G02B 5/3058* (2013.01); *G02B 2027/0125* (2013.01); *G02B 2027/0134* (2013.01)

(58) Field of Classification Search
CPC ............ G03H 2001/0426; G03H 1/00; G03H 2001/0016; G03H 2001/0212; G03H 2222/14; G03H 2222/15; G03H 2222/16; G03H 2222/17; G03H 2222/18; G03H 2222/20; G03H 2222/33; G03H 2222/34; G03H 2222/35; G03H 2222/36; G03H 2222/40; G02B 27/22; G02B 27/2228; G02B 27/2264; G02B 27/26; G02B 27/28; G02B 21/22; H04N 13/04; H04N 13/0429; H04N 13/0434; H04N 13/0436; H04N 13/0438
USPC .................. 359/465, 466, 22, 23, 27, 34
See application file for complete search history.

(56) References Cited

U.S. PATENT DOCUMENTS

| | | |
|---|---|---|
| 5,526,184 A | 6/1996 | Tokuhashi et al. |
| 6,011,653 A | 1/2000 | Karasawa |
| 6,094,181 A | 7/2000 | Hildebrand et al. |
| 6,239,908 B1 * | 5/2001 | Kelly ................... G02B 23/14 348/54 |
| 6,271,924 B1 | 8/2001 | Ngoi et al. |
| 6,433,760 B1 | 8/2002 | Vaissie et al. |
| 7,057,739 B2 | 6/2006 | Hill |
| 7,326,930 B2 | 2/2008 | Crawelym |
| 7,878,658 B2 | 2/2011 | Hudman et al. |
| 8,223,342 B2 | 7/2012 | Tucker |
| 8,873,149 B2 | 10/2014 | Bohn et al. |
| 2002/0003610 A1 | 1/2002 | Park et al. |
| 2006/0171691 A1 | 8/2006 | Kurahashi et al. |
| 2013/0106674 A1 * | 5/2013 | Wheeler ............... G02B 27/017 345/8 |

OTHER PUBLICATIONS

Peng, et al., "Design of MacNeille Polarizing Beam Splitter", in IEEE Symposium on Photonics and Optoelectronics, Aug. 14, 2009, 4 pages.

Hua, Hong and Gao, Chunyu, "A Polarized Head-Mounted Projective Display," Coll. Opt. Sci., Arizona Univ., Tucson, AZ. Conference: 4th IEEE and ACM Int'l. Symposium on Mixed and Augmented Reality, 2005, 4 pages.

CRL Opto, "Application Note—HMDs and Microdisplays (Basics)," CRL Opto Limited, Dawley Road, Hayes, Middlesex, UK, 2003, 8 pages.

"International Search Report and Written Opinion Issued in PCT Application No. PCT/US2016/045449", Mailed Date: Nov. 10, 2016, 11 Pages.

* cited by examiner

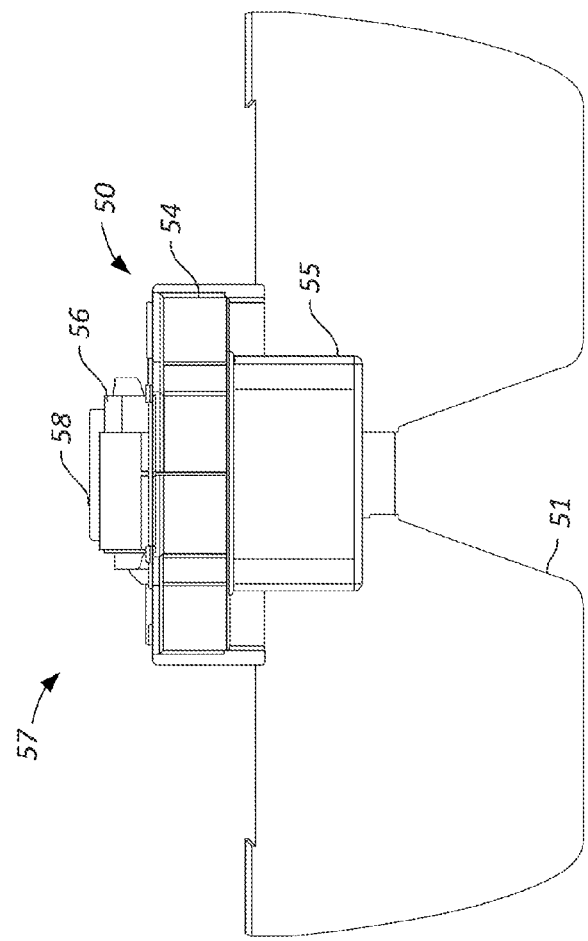
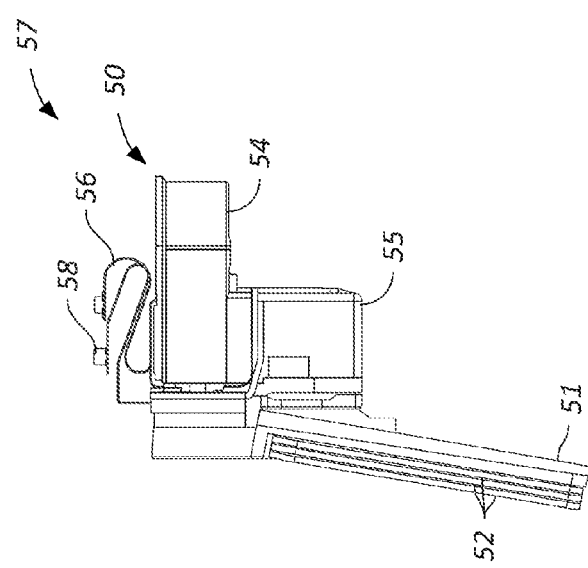
FIG. 5B
FIG. 5A

LEFT AND RIGHT EYE OPTICAL PATHS WITH SHARED OPTICAL ELEMENT FOR HEAD-MOUNTED DISPLAY DEVICE

BACKGROUND

Virtual reality (VR) and augmented reality (AR) visualization systems are starting to enter the mainstream consumer marketplace. AR Head-Mounted Display (HMD) devices ("AR-HMD devices") are a promising application of such technology. AR-HMD devices include image generation components and optics that enable a user to see virtual content superimposed over the user's view of the real world. Virtual content that appears to be superimposed over the user's real-world view is commonly referred to as AR or holographic content. VR and AR visualization systems can provide users with entertaining, immersive three-dimensional (3D) virtual environments in which they can visually experience things they might not normally experience in real life.

SUMMARY

The technique introduced here includes a display engine assembly for a head-mounted display device. In certain embodiments, the display engine assembly includes a first imager and a second imager to generate a left image and a right image, respectively, in a head-mounted display device. The left and right images are left and right components, respectively, of a single stereoscopic image. The display engine further includes an optical waveguide optically coupled to both the first imager and the second imager. The optical waveguide is part of a first optical path to convey the left image to a left eye of a user of the head-mounted display device and is also part of a second optical path to convey the right image to a right eye of the user of the head-mounted display device. In certain embodiments, the optical waveguide is a polarizing bean splitter (PBS), for example. In certain embodiments, the display engine assembly includes two or more optical waveguides each forming a portion of both the first and second optical paths, any one or more of which may be a PBS, for example.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

FIG. 5A illustrates a left side view of an example of a display assembly for use in an HMD.

FIG. 5B illustrates a front view of the display assembly of FIG. 5A.

DETAILED DESCRIPTION

Figure 1:
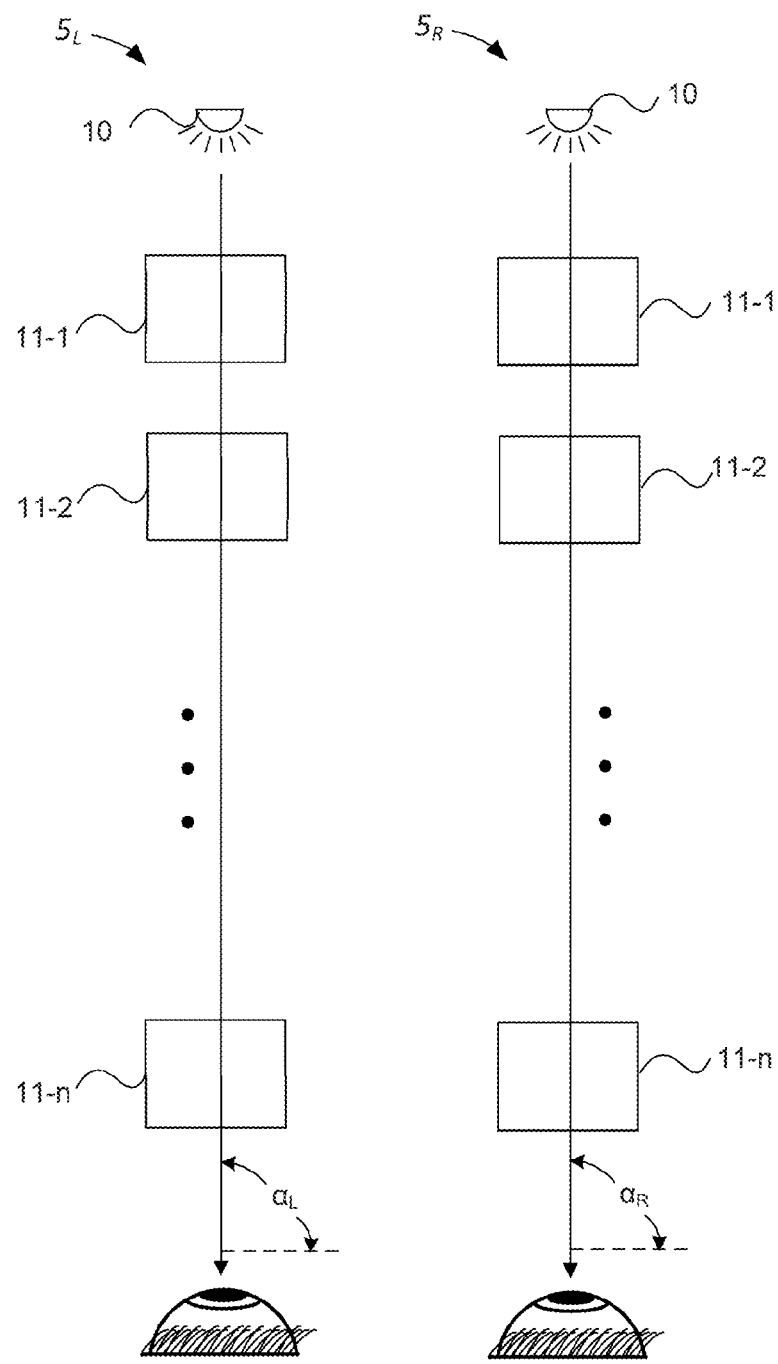
FIG. 1 schematically illustrates an example of left and right optical paths in an HMD device.

In this description, references to "an embodiment," "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

To provide 3D visualization, an AR-HMD device generates separate holographic images for the left and right eye of the user, and those images propagate along separate but parallel optical paths to the user's eyes. The left and right images appear to be slightly offset laterally, so as to provide the user with a 3D visual effect. The inventors of this application have determined that for an AR-HMD device to work optimally, the angle at which light representing an image enters the user's eye from the device, called the "boresight," should be maintained precisely for both the left and right eyes. Even minor variations in boresight angle between the left and right images can cause degradation in image quality. The inventors of this application have further determined that even minor fluctuations in boresight between the left and right images can cause the user to feel severe discomfort, including eye strain, dizziness, headache and/or nausea. Hence, boresight stability is important in the design of such an HMD device.

However, maintaining boresight stability between the left and right images in an AR-HMD device is a challenge. The left and right optical paths each may include a number of individual components, including one or more imagers, lenses, beam splitters, waveguides, etc. Mechanical stresses due to normal use of the device and/or thermal expansion due to heat from electronics can cause relative movement of components, resulting in unacceptable variations in boresight.

The technique introduced here addresses this problem by including, in an HMD device, at least one optical waveguide that forms part of both the left and right optical paths, while still maintaining optical separation between, and independence of, the left and right optical paths. Such an optical waveguide shared by (common to) the left and right optical paths may be a polarizing beam splitter (PBS), for example. In certain embodiments, two or more such shared optical waveguides (e.g., PBSs) are included in an HMD device, to further improve boresight stability.

The sharing of at least one optical waveguide (e.g., a PBS) between the left and right optical paths makes the HMD less sensitive to mechanical stresses and thermal expansion than a design in which separate PBSs are used for the left and right optical paths, thereby improving boresight stability between the left and right optical paths. Additionally, it may reduce the likelihood of errors during assembly, since there are fewer parts to assemble. Notably, the use of separate PBSs and other components for left and right optical paths might otherwise be preferable from a manufacturing perspective, since it would allow the use of smaller optical components, which may be less costly to produce, thereby potentially reducing the overall cost of the device. However, the inventors of the present application have recognized that this factor may be outweighed by at least the greater boresight stability provided by the technique introduced here, in which at least one PBS is shared by the left and right optical paths.

As illustrated in FIG. 1, a particular HMD device, such as an AR-HMD device for example, may include separate light sources 10 for generating the left and right eye images of the user's left and right eye, respectively. The light sources 10 may include, for example, red, green and blue light emitting diodes (LEDs) for each of the left and right eye. Additionally, the device includes a number of additional optical elements 11 (11-1 through 11-n), some of which may be active and some of which may be passive, that collectively form the optical path $5_L$ and right optical path $5_R$ for the left and right images, respectively. In the embodiment of FIG. 1, the left and right optical paths $5_L$ and $5_R$ are formed by separate but identical (and parallel) sets of optical components 11. The optical components 11 in each optical path may include, for example, one or more lenses, beam splitters, micro-display imagers, waveguides, etc. Note that some of the optical components may be transmissive, some may be reflective, and some may be both transmissive and reflective (selectively or simultaneously). In addition, some of the components may be active (e.g., the micro-display imagers) while others are passive.

Ideally, the boresight angle, $\alpha$, should be identical for the left and right optical paths $5_L$ and $5_R$. However, in practice, mechanical stresses and or thermal expansion of components in an optical path, or in contact with an optical path, can cause displacement, location and/or deformation of various components. These factors can cause the left boresight angle, $\alpha_L$, the right boresight angle, $\alpha_R$, or both, to vary relative to the ideal angle and to each other, thereby causing degradation of image quality and/or discomfort to the user.

Figure 2A:
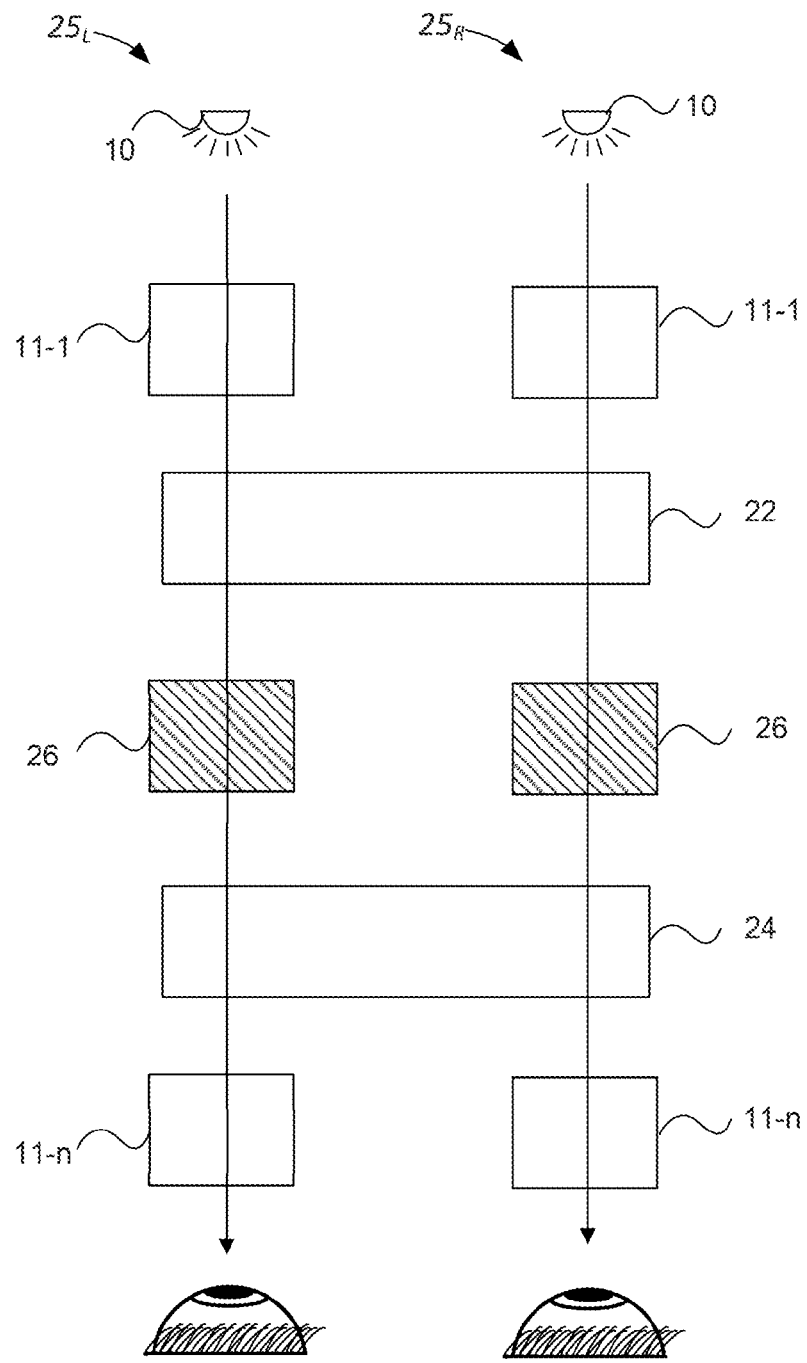
FIG. 2A schematically illustrates an example of left and right optical paths in an HMD device, with at least one PBS shared therebetween.
Figure 2B:
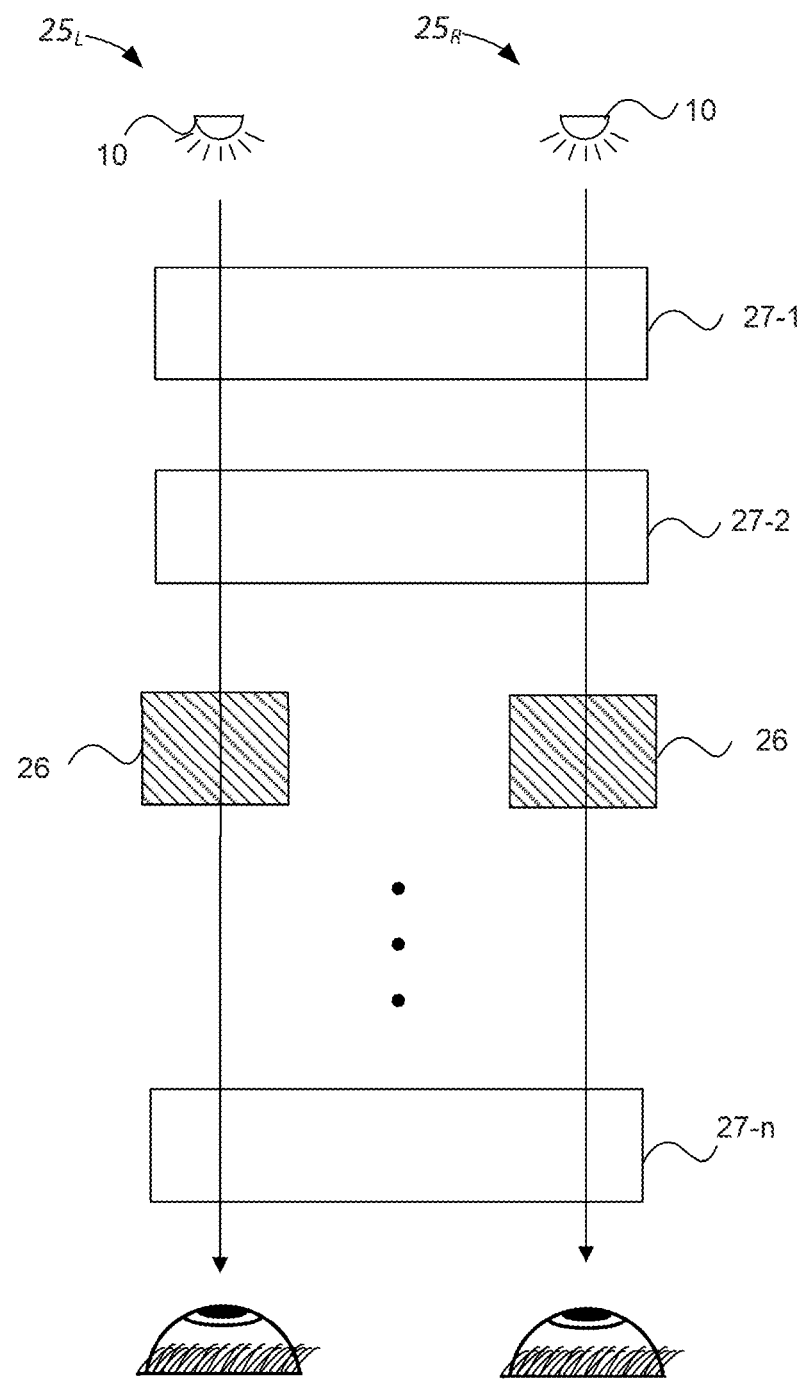
FIG. 2B schematically illustrates an example of left and right optical paths in an HMD device, with every passive optical component shared therebetween.

FIGS. 2A and 2B illustrate a solution to this problem, according to the technique introduced here. The technique includes having at least one optical component be shared by the left and right optical paths $25_L$ and $25_R$. For example, in certain embodiments represented in FIG. 2A, the HMD device includes at least one PBS 22, 24 shared by the left and right optical paths $25_L$ and $25_R$. This approach reduces the opportunity for variation in boresight angle between the left and right optical paths $25_L$ and $25_R$. Ideally, at least every passive optical component 27 (i.e., not the light sources 10 and imagers 26) would be shared between the left and right optical paths $25_L$ and $25_R$, as illustrated in FIG. 2B. Additionally, it may be advantageous to form two or more adjacent components in a given optical path from the same block of material. However, in practice such configuration may not be achievable, due to design or manufacturing constraints, for example. Accordingly, a solution in which at least one PBS is shared by the left and right optical paths (as per FIG. 2A, showing two shared PBSs), is an achievable and advantageous solution.

Figure 3:
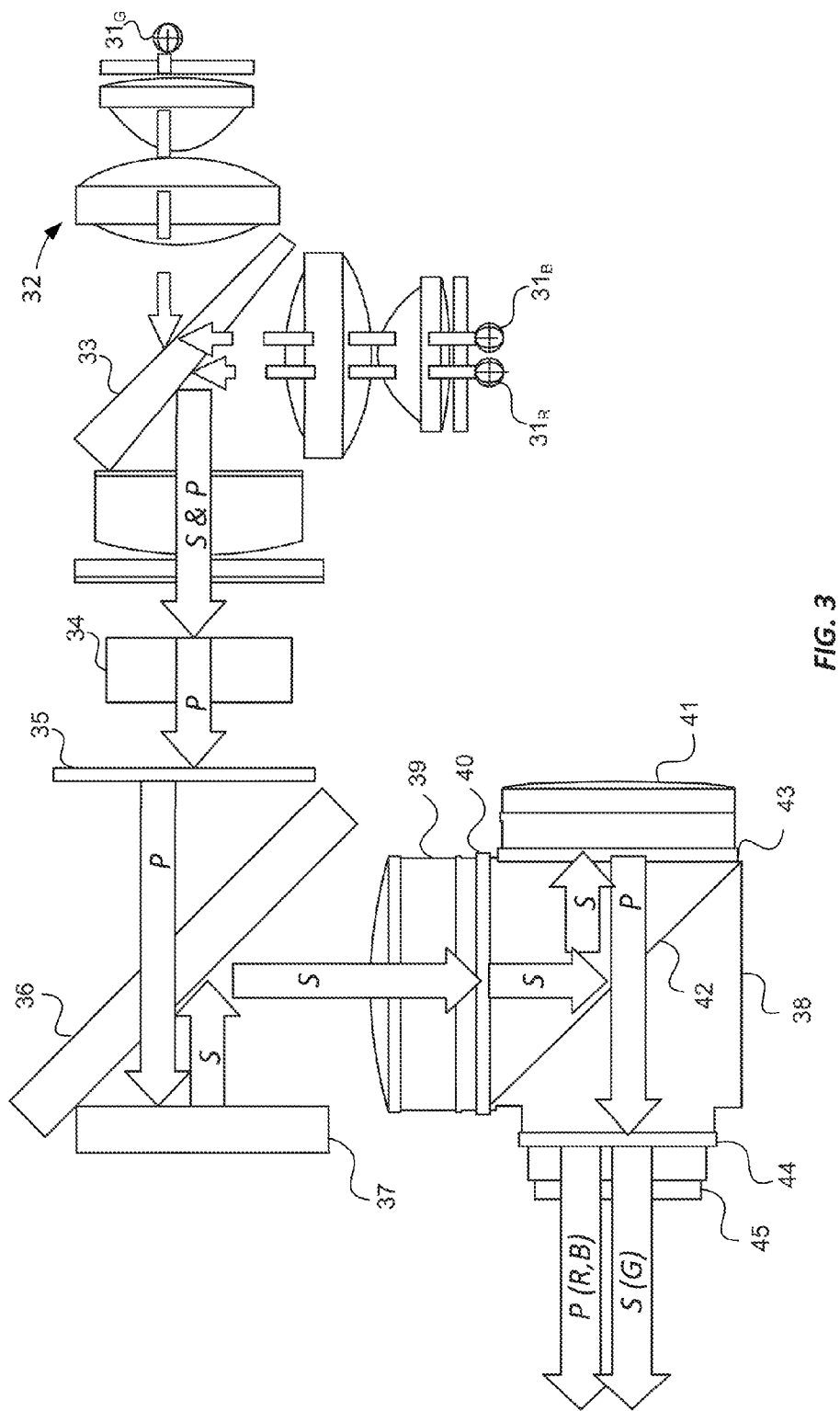
FIG. 3 schematically shows in greater detail an example of components forming an optical path in an HMD device.

FIG. 3 illustrates in greater detail how one or more shared PBSs can be incorporated into an optical path in an HMD. More specifically, FIG. 3 schematically shows an example of components forming an optical path in an HMD device. To facilitate illustration, only one optical path is shown, which is representative of either the left optical path or the right optical path. The illustrated components can be included within a display engine assembly within an HMD device, as described further below. Note that in practice, the optical path may include additional components not shown, that are not germane to this description, and/or may omit some of the illustrated components.

In embodiments represented by FIG. 3, the illumination sources include a red LED $31_R$, green LED $31_G$ and blue LED $31_B$, that each produces unpolarized light (s- and p-polarized). Light from the red, green and blue LEDs is transmitted through one or more lenses 32 and then is either further transmitted (in the case of the green light) or reflected (in the case of the red and blue light) along the optical path by a dichroic mirror 33, which combines the red, green and blue light so that their paths are nominally aligned along the optical axis.

Figure 4:
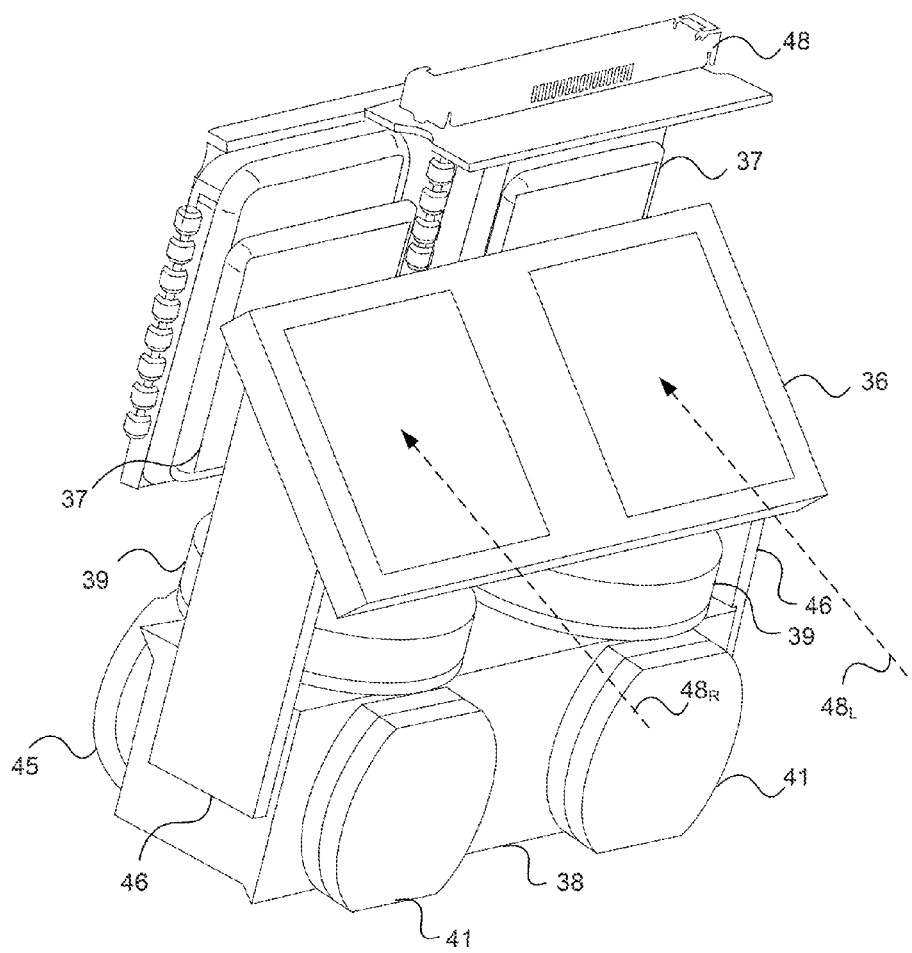
FIG. 4 illustrates an example of an optics assembly in which a shared birdbath PBS and a shared wire grid PBS can be physically integrated with other optical components.
Figure 6A:
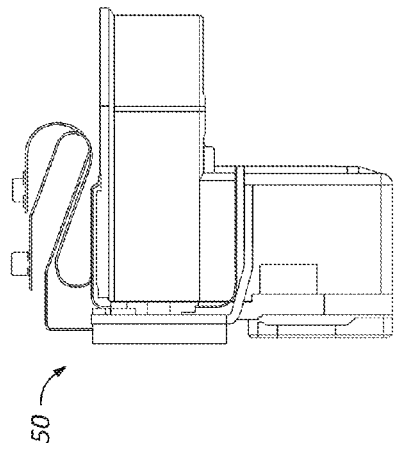
FIG. 6A shows a front view of the display engine assembly of the display assembly of FIGS. 5A and 5B.
Figure 6B:
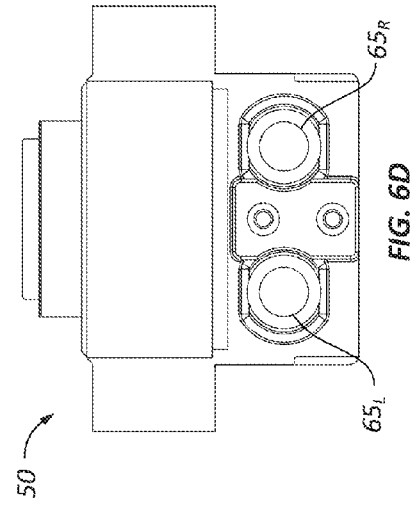
FIG. 6B shows a side view of the display engine assembly of the display assembly of FIGS. 5A and 5B.
Figure 6C:
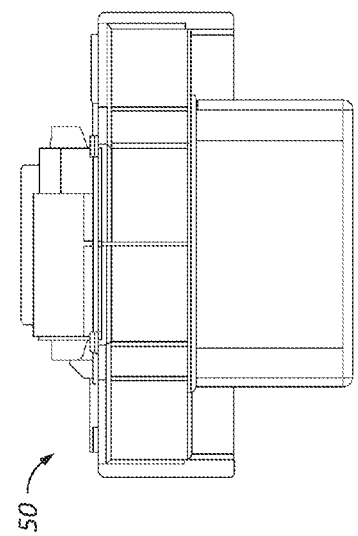
FIG. 6C shows a top view of the display engine assembly of the display assembly of FIGS. 5A and 5B.
Figure 6D:
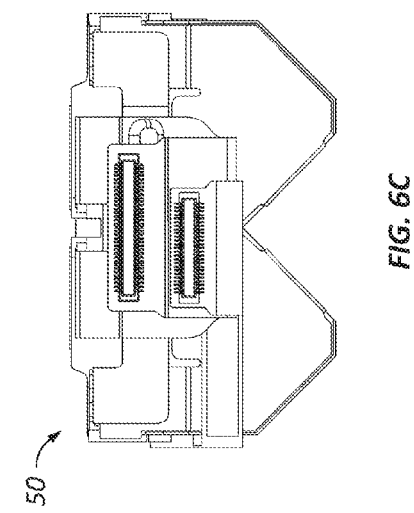
FIG. 6D shows a rear view of the display engine assembly of the display assembly of FIGS. 5A and 5B.

The combined red, green and blue light (collectively "light") propagates to the left (in the illustration) through one or more additional optical elements, including a p polarizer 34 that filters out the s-polarized light. The resulting p-polarized light then passes through a pre-polarizer 35 and then through a wire grid PBS 36 to impinge upon an imager 37. The wire grid PBS 36 is one of two optical components shared by the left and right optical paths in this embodiment, the other being birdbath PBS 38. The sharing of wire grid PBS 36 and birdbath PBS 38 by the left and right optical paths is not shown in FIG. 3 to simplify illustration, but is shown in FIG. 4, discussed below.

The imager 37, which may be a liquid crystal on silicon (LCOS) micro-display, for example, is controlled by image generation electronics (not shown) to selectively reflect or absorb light incident upon it, to produce an image. Note that in some embodiments, the optical path for each eye may include two or more imagers (such as imager 37). For example, multiple imagers per optical path may be used for time multiplexing of multiple images per eye, or to occlude a portion of one image generated by a first imager with another image generated by a second (or additional) imager.

Light reflected by the imager 37 is s-polarized and reflected back toward the wire grid PBS 36. The wire grid PBS 36 then reflects this light at a 90° angle downward toward a set of additional optics, including lens 39, post-polarizer 40 and birdbath PBS 38.

The "birdbath" PBS 38 is so named because of its use with a birdbath-shaped reflective lens 41. As shown, the birdbath PBS 38 includes an internal optical interface 42. To create interface 42, the birdbath PBS 38 may be constructed from two right-triangular prisms affixed together (e.g., with optical adhesive) and forming the shape of a rectangular box.

The s-polarized light initially impinges upon interface 42 inside the birdbath PBS 38 and is reflected at a 90° angle to the right, toward a quarter-wave plate (QWP) 43 (which transmissively rotates polarization of incident light in either direction by 45 degrees) and then to the birdbath lens 41, where the light is reflected back toward interface 42 as p-polarized light. The p-polarized light is then transmitted through interface 42 and subsequently exits the birdbath PBS 38 at the left. The light exiting the birdbath PBS 38 then passes through a color-selecting polarizer (CSP) 44 to produce p-polarized red and blue light and s-polarized green light, which exits the optical path via an output lens 45. The CSP 44 rotates polarization on a wavelength-dependent basis. For example, in certain embodiments only green light polarization is altered but red and blue are nominally unaffected.

FIG. 4 illustrates an example of an optics assembly in which the shared wire grid PBS 36 and shared birdbath PBS 38 can be physically integrated with other optical components of an HMD device. To simplify illustration, some of the components shown in FIG. 3 are not shown in FIG. 4. Arrows $48_L$ and $48_R$ indicate the direction of incident light originating from the left and right light sources, respectively. The shared birdbath PBS 38 is coupled to the wire grid PBS 36 by two frame members 46. As shown, the frame members 46 can be coupled to the opposing small sides of the birdbath PBS 38 at one end and to a "downstream" surface (not visible in FIG. 4) of the wire grid PBS 36 at the other end. In some embodiments, at least the birdbath PBS 38 and frame members 46 are formed from the same material, such as optical grade glass; this construction helps to avoid relative movement between components that could otherwise result from a mismatch in their thermal expansion characteristics. FIG. 4 further shows an example of the spatial relationships between the above mentioned components and the imagers 37 and various lenses 39, 41 and 45. Additionally, an electrical connector 48 is coupled to the imagers to provide an electrical control interface for the imagers.

Configurations such as shown in FIGS. 3 and 4 can be incorporated into a display assembly in an HMD device. An example of such a display assembly is illustrated in FIGS. 5A and 5B, which show orthogonal left side and front views, respectively, of such a display assembly 57. The display assembly 57 is designed to overlay holographic images on the user's view of his real-world environment, e.g., by projecting light into the user's eyes. The display assembly 57 includes a display engine assembly 50, a waveguide carrier 51 and multiple waveguides 52. The display engine assembly 50 houses the various components discussed above, including the light sources, shared PBSs, lenses, etc. In particular, the light sources are contained within the horizontally protruding portion 54 of the display engine assembly 50, while the imagers, shared wire grid PBS, shared birdbath PBS, and other optical components are housed within the vertical portion 55 of the display engine assembly 50. FIGS. 6A, 6B, 6C and 6D show, respectively, front, side, top and rear orthogonal views of the display engine assembly 50.

The waveguides 52 include separate red, green and blue waveguides for each of the left and right eyes. Left and right optical output ports $65_L$ and $65_R$ (FIG. 6D) of the display engine assembly 50 are optically coupled respectively to the left and right output lenses 45 (FIGS. 3 and 4), and are optically coupled respectively to left and right optical input ports (not shown) of the waveguides 52.

The waveguide carrier 51 servers as a mounting structure for the waveguides 52 and the display engine assembly 50, and serves to attach these components to the rest of the HMD, as described further below. In the illustrated embodiment, the display assembly also includes flex circuit 56, which is electrically coupled to the imagers and light sources within the display engine assembly, and which includes connectors 58 for connection to external electronics and power source (not shown).

Figure 7:
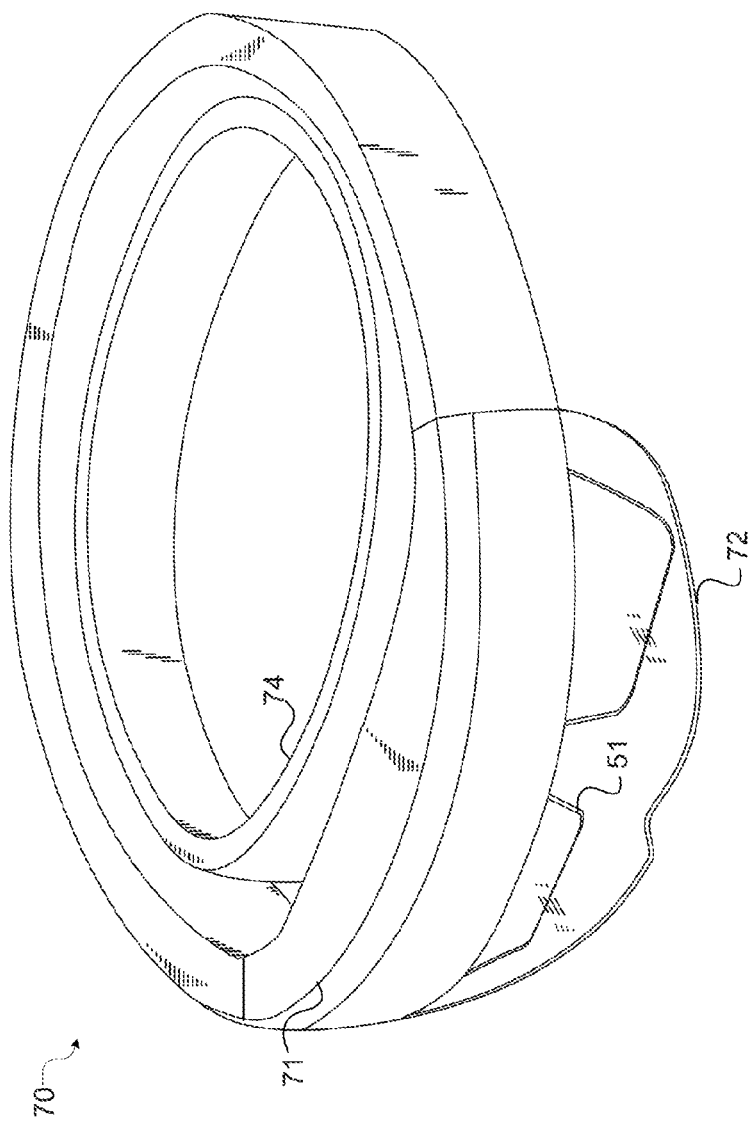
FIG. 7 illustrates an example of an AR-HMD that can incorporate the display assembly of FIGS. 5A and 5B.

FIG. 7 illustrates an example of an AR-HMD 70 that can incorporate the display assembly 57 of FIGS. 5A and 5B, including one or more shared PBSs as described above. In certain embodiments, the display assembly 57 of FIG. 5 is mounted to a chassis 71, on which various sensors and electronics (not shown) are also mounted. The chassis 71 is part of a protective sealed visor assembly 72 that contains the sensors, electronics, and display components.

The HMD device 70 includes an adjustable headband (or other type of head fitting) 74, attached to the chassis 71, by which the AR-HMD device 70 can be worn on a user's head. In certain embodiments, the visor assembly 72 encloses various sensors and other components (not shown), such as one or more microphones, visible-spectrum head-tracking tracking cameras, infrared (IR) spectrum depth cameras, IR illumination sources, and visible spectrum video cameras. The visor assembly 72 may also enclose electronics (not shown) to control the functionality of the display assembly and other functions of the AR-HMD 70.

EXAMPLES OF CERTAIN EMBODIMENTS

Certain embodiments of the technology introduced herein are summarized in the following numbered examples:

1. A display engine assembly comprising: a first imager to generate a left image in a head-mounted display device; a second imager to generate a right image in the head-mounted display device, the left and right images being left and right components, respectively, of a single stereoscopic image; and an optical waveguide optically coupled to the first imager and the second imager, the optical waveguide being part of a first optical path to convey the left image to a left eye of a user of the head-mounted display device and being part of a second optical path to convey the right image to a right eye of the user of the head-mounted display device.

2. The display engine assembly of example 1, wherein the optical waveguide is a first polarizing beam splitter.

3. The display engine assembly of example 1 or example 2, further comprising a second polarizing beam splitter, the second polarizing beam splitter being part of the first optical path and the second optical path.

4. The display engine assembly of any of examples 1 through 3, wherein the second polarizing beam splitter is a wire grid beam splitter.

5. The display engine assembly of any of examples 1 through 4, wherein the first polarizing beam splitter is composed at least partially of glass, the display engine assembly further comprising a first glass frame member coupling the first polarizing beam splitter to the second polarizing beam splitter.

6. The display engine assembly of any of examples 1 through 5, further comprising a second glass frame member coupling the first polarizing beam splitter to the second polarizing beam splitter, wherein the first and second glass frame members are coupled to opposite sides of the first polarizing beam splitter.

7. The display engine assembly of any of examples 1 through 6, wherein the first polarizing beam splitter is shaped as a rectangular box.

8. The display engine assembly of any of examples 1 through 7, further comprising at least one of: a third imager to generate a second left image for the left eye of the user, the third imager disposed optically between the first polarizing beam splitter and a first illumination source of the head-mounted display device; or a fourth imager to generate a second right image for the right eye of the user, the fourth imager disposed optically between the first polarizing beam splitter and a second illumination source of the head-mounted display device.

9. An apparatus comprising: a first plurality of illumination sources; a left imager to generate a left image for a left eye of a user of a head-mounted display device, based on light from the first plurality of illumination sources; a second plurality of illumination sources; a right imager to generate a right image for a right eye of the user of the head-mounted display device, based on light from the second plurality of illumination sources; a first polarizing beam splitter, optically coupled to both the left imager and the right imager, to convey the left image and the right image to left and right output ports, respectively, of the display engine wherein the first polarizing beam splitter is composed at least partially of glass; a second polarizing beam splitter disposed in an optical path between the first polarizing beam splitter and the left and right imagers; and a plurality of glass frame members coupling the first polarizing beam splitter to the second polarizing beam splitter.

10. The apparatus of example 9, wherein the second polarizing beam splitter is a wire grid beam splitter.

11. The apparatus of example 9 or example 10, wherein the plurality of glass frame members are coupled to opposite sides of the first polarizing beam splitter.

12. The apparatus of any of examples 9 through 11, wherein the first polarizing beam splitter is shaped as a rectangular box.

13. The apparatus of any of examples 9 through 12, further comprising at least one of: a second left imager to generate a second left image for the left eye of the user, the second left imager disposed optically between the first polarizing beam splitter and the first plurality of illumination sources; or a second right imager to generate a second right image for the right eye of the user, the second right imager disposed optically between the first polarizing beam splitter and the second plurality of illumination sources.

14. A head-mounted display device comprising: a head fitting by which the head-mounted display device can be mounted to the head of a user; a display engine assembly coupled to the head fitting and including a first imager to generate a left image for a left eye of a user of the head-mounted display device, a second imager to generate a right image for a right eye of the user of the head-mounted display device, a left optical output port, a right optical output port, and a first polarizing beam splitter, optically coupled to both the first imager and the second imager, to convey the left image and the right image to the left and right optical output ports, respectively; a plurality of waveguides separately coupled to the left and right optical output ports, to convey the left and right images toward the left and right eyes, respectively, of the user; a processor to control operation of the head-mounted display device; and a plurality of sensors coupled to the processor.

15. The head-mounted display device of example 14, wherein the display engine assembly further comprises a second polarizing beam splitter disposed in an optical path between the first polarizing beam splitter and the first and second imagers.

16. The head-mounted display device of example 14 or example 15, wherein the second polarizing beam splitter is a wire grid beam splitter.

17. The head-mounted display device of any of examples 14 through 16, wherein the first polarizing beam splitter is composed at least partially of glass, the display engine assembly further comprising a first glass frame member coupling the first polarizing beam splitter to the second polarizing beam splitter.

18. The head-mounted display device of any of examples 14 through 17, wherein the display engine assembly further comprises a second glass frame member coupling the first polarizing beam splitter to the second polarizing beam splitter, wherein the first and second glass frame members are coupled to two opposite sides of the first polarizing beam splitter.

19. The head-mounted display device of any of examples 14 through 18, wherein the first polarizing beam splitter is shaped as a rectangular box.

20. The head-mounted display device of any of examples 14 through 19, wherein the display engine assembly further comprises at least one of: a third imager to generate a second left image for the left eye of the user, the third imager disposed optically between the first polarizing beam splitter and a first illumination source of the head-mounted display device; or a fourth imager to generate a second right image for the right eye of the user, the fourth imager disposed optically between the first polarizing beam splitter and a second illumination source of the head-mounted display device.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A head-mounted display device comprising:
a head fitting by which the head-mounted display device can be mounted to the head of a user;
a display engine assembly coupled to the head fitting and including
a first imager to generate a left image for a left eye of a user of the head-mounted display device,
a second imager to generate a right image for a right eye of the user of the head-mounted display device,
a left optical output port,
a right optical output port, and
a first polarizing beam splitter, optically coupled to both the first imager and the second imager, to convey the left image and the right image through the first polarizing beam splitter to the left and right optical output ports, respectively;
a plurality of waveguides separately coupled to the left and right optical output ports, to convey the left and right images toward the left and right eyes, respectively, of the user;
a processor to control operation of the head-mounted display device; and
a plurality of sensors coupled to the processor.

2. The head-mounted display device of claim 1, wherein the display engine assembly further comprises a second polarizing beam splitter disposed in an optical path between the first polarizing beam splitter and the first and second imagers.

3. The head-mounted display device of claim 2, wherein the second polarizing beam splitter is a wire grid beam splitter.

4. The head-mounted display device of claim 2, wherein the first polarizing beam splitter is composed at least partially of glass, the display engine assembly further comprising a first glass frame member coupling the first polarizing beam splitter to the second polarizing beam splitter.

5. The head-mounted display device of claim 4, wherein the display engine assembly further comprises a second glass frame member coupling the first polarizing beam splitter to the second polarizing beam splitter, wherein the first and second glass frame members are coupled to two opposite sides of the first polarizing beam splitter.

6. The head-mounted display device of claim 1, wherein the first polarizing beam splitter is shaped as a rectangular box.

7. The head-mounted display device of claim 1, wherein the display engine assembly further comprises at least one of:
- a third imager to generate a second left image for the left eye of the user, the third imager disposed optically between the first polarizing beam splitter and a first illumination source of the head-mounted display device; or
- a fourth imager to generate a second right image for the right eye of the user, the fourth imager disposed optically between the first polarizing beam splitter and a second illumination source of the head-mounted display device.

* * * * *